No. 854,741. PATENTED MAY 28, 1907.
E. M. HEWLETT.
REVERSE PHASE RELAY.
APPLICATION FILED MAY 4, 1905.

Witnesses.
J. Ellis Glen.
Helen Orford.

Inventor:
Edward M. Hewlett
by Albert G. Davis
Att'y.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

REVERSE-PHASE RELAY.

No. 854,741.  Specification of Letters Patent.  Patented May 28, 1907.

Application filed May 4, 1905. Serial No. 258,887.

*To all whom it may concern:*

Be it known that I, EDWARD M. HEWLETT, a citizen of the United States, residing at Schenectady, county of Schenectady, State of New York, have invented certain new and useful Improvements in Reverse-Phase Relays, of which the following is a specification.

My invention relates to protecting devices for polyphase circuits, and its object is to provide a simple and efficient relay adapted to open such a circuit upon a relative reversal of the phases thereof. In certain cases it is important that a polyphase circuit should be opened immediately upon a relative reversal of the phases. Thus, for instance, in the case of an elevator driven by a polyphase motor, if the phases should become relatively reversed by accident the direction of rotation of the motor would be reversed and serious consequences might ensue if the motor circuit were not immediately broken. For cases of this kind reverse-phase relays have been devised heretofore consisting essentially of a small polyphase induction motor with the primary coils energized from the polyphase circuit to be protected and a pivoted armature controlling the tripping circuit of switches in the polyphase circuit. Upon a reversal of phase in the main circuit the direction of torque in the relay is reversed which reversal may be utilized to close the tripping circuit so that the main circuit is immediately opened.

My invention consists in providing a novel reverse-phase relay of exceedingly simple form, which is much more economical to construct than a relay of the induction motor type, and which is equally efficient and reliable in giving the desired protection.

My invention consists in providing a rectilinearly-movable member, with a plurality of coils connected to the circuit to be protected and arranged to produce a progressive shifting of flux in the line of movement of said member, with means for normally preventing the movement of said member when the direction of the progression of the field is in the normal direction, and arranging the member to close a tripping circuit upon its movement in the opposite direction upon a reversal of the direction of shifting of the field.

Figure 1:
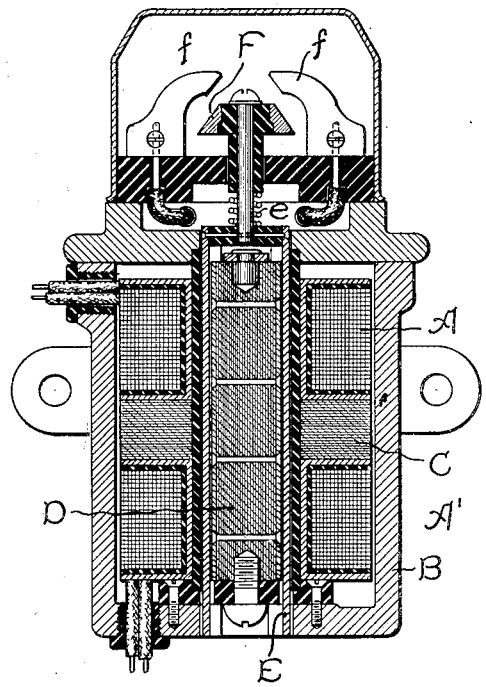
Figure 2:
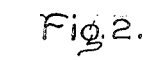
Figure 3:
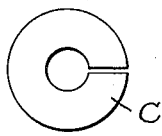
Figure 3:
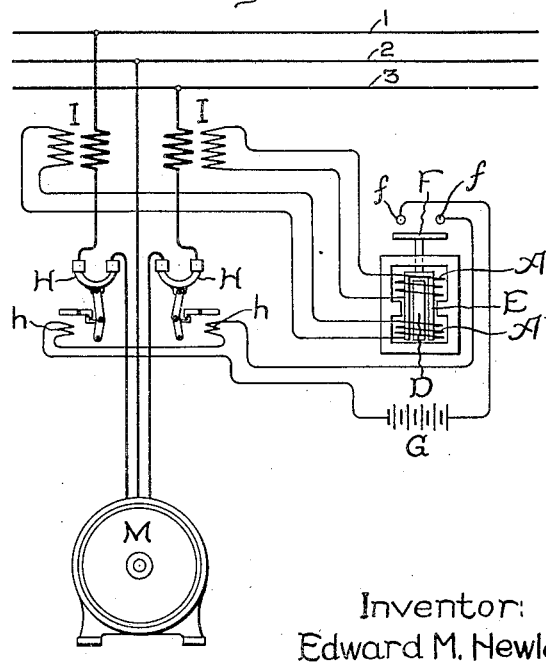

My invention will best be understood by reference to the accompanying drawings, in which Figure 1 shows a cross-sectional elevation of a relay constructed in accordance with my invention; Fig. 2 shows diagrammatically the circuit connections of such a relay; and Fig. 3 shows a detail on a reduced scale of one of the laminations employed in the construction of the relay.

In Fig. 1, A and A' represent two coils which are energized from different phases of the polyphase circuit to be protected. These coils are supported within a suitable box or receptacle B, and are separated by circular laminations C which are formed with their electrical continuity broken, as indicated in Fig. 3, in order to prevent the circulation of eddy currents due to induction from the coils A, A'. D represents a central laminated core formed of sheets or wires of magnetic material. The laminations C and the box B form a nearly closed magnetic circuit for each coil, and since the two coils are connected in different phases a progression of field flux is obtained in one direction or the other axially with respect to the core D. It has been found that it is not essential that the box B should be laminated. It may be made of cast iron, as indicated in the drawings. Between the core D and the coils is inserted a light tube E which is preferably made of aluminium so as to obtain good conductivity with small weight. The progressive shifting of the flux due to the coils A A' tends to produce a longitudinal rectilinear movement of the tube E. The tube is normally held seated by gravity, and the coils A, A', are so connected that the normal progression of flux is in a downward direction so as to assist the weight of the tube in holding it seated. The tube carries at its upper end a contact F. which, when the tube E is raised, is adapted to engage and bridge the stationary contacts $ff$. A light spring $e$ is inserted between the contact F and the tube E to take up any shock produced when contact F strikes the contacts $ff$. This upward movement of the tube E and consequent bridging of the contacts $ff$ is produced whenever the phase relation of the currents in the coils A A' is reversed by a phase reversal in the circuit to which these coils are connected, and the bridging of the contacts $ff$ may be utilized to open the circuit immediately.

The circuit connections for a three-phase system are shown diagrammatically in Fig. 2. 1, 2 and 3 represent the line-wires from which the three-phase motor M is supplied. The coils A A' of the relay are connected in series or in shunt with the motor leads either directly or through transformers I, I. When the contact F bridges the contact $ff$ a circuit is closed through the battery or other source of current G, and the tripping coils $h\ h$ of the circuit-breakers H H in series with the motor, and the motor circuit is broken. Rotation of the motor in the wrong direction due to the phase-reversal in the supply system is thus rendered impossible. Or instead of closing the tripping circuit as shown, the relay may take the place of the tripping coil $h$ and act directly on the latch of the switch H to trip it.

Exactly the same arrangement of relay and circuit connections may be employed for a two-phase circuit as are shown for the three-phase circuit.

What I claim as new and desire to secure by Letters Patent of the United States, is,—

1. In a relay, in combination with a circuit to be protected, a rectilinearly-movable member, a plurality of coils energized with currents of different phase and adapted to produce a progression of the flux along the line of movement of said member, means for normally restraining the movement of said member, and means operated by a movement of said member in the opposite direction for opening said circuit.

2. In a relay, a longitudinally-movable conducting member, a series of coils surrounding said member and energized with currents of different phase whereby a progression of the flux is produced axially with respect to said member, means for normally restraining the movement of said member, and a switch contact operated by said member upon a movement of said member in the opposite direction.

3. In a relay, a central core, a series of coils surrounding said core and energized with currents of different phase whereby a progression of flux is produced in an axial direction in said core, a normally-inoperative member movable upon a reversal of the direction of progression of flux in said core, and a switch contact operated by the movement of said member.

4. In a relay, a central core, a series of coils surrounding said core and energized with currents of different phase whereby a progression of flux is produced in an axial direction in said core, a light conducting tube surrounding said core, means for preventing a movement of said tube in the direction of the normal progression of said flux, and a switch contact operated by the movement of said tube in the opposite direction.

5. In combination with a polyphase circuit, a series of coils energized from different phases of said circuit and arranged to produce a rectilinear progression of flux, a rectilinearly-movable conducting member subjected to said flux, means for restraining the movement of said member in the direction of the normal progression of said flux, and means for opening said circuit upon a movement of said member in the opposite direction.

6. In combination, a polyphase circuit, a longitudinally movable conducting member, a series of coils surrounding said member and energized from different phases of said circuit whereby a progression of flux is produced axially with respect to said member, means for preventing a movement of said member in the direction of normal progression of said flux, a switch contact operated by the movement of said member in the opposite direction, and switches controlled by said contact and adapted to open said polyphase circuit.

7. In combination, a polyphase circuit, a magnetic core, a series of coils surrounding said core and energized from different phases of said circuit whereby a progression of flux is produced in an axial direction in said core, a light conducting tube surrounding said core, a contact operatively connected to said tube, means for preventing the movement of said tube in the direction of normal progression of said flux, a trip circuit arranged to be closed by said contact upon a movement of said tube in the opposite direction, trip coils in said circuit, and switches controlled by said trip coils and adapted to open said polyphase circuit.

8. In a relay, a series of axially-displaced coils energized with currents of different phase, a rectilinearly-movable conducting member disposed axially with respect to said coils, means for restraining the movement of said member in one direction, and a switch contact operated by the movement of said member in the opposite direction.

9. In combination, a polyphase circuit, a rectilinear movable member, a series of coils energized from the several phases of said circuit and adapted to produce a progression of flux along the line of movement of said member, means for normally restraining the movement of said member, and means operated by a movement of said member in the opposite direction for opening said polyphase circuit.

10. In combination, a polyphase circuit, a magnet core, a series of axially displaced coils surrounding said core and energized from different phases of said circuit, a light conducting tube surrounding said core, means for preventing the movement of said tube in the direction of the normal progression of the flux to said coils, and means operated by a movement of said tube in the opposite direction for opening said polyphase circuit.

In witness whereof, I have hereunto set my hand this 2nd day of May, 1905.

EDWARD M. HEWLETT.

Witnesses:
 BENJAMIN B. HULL,
 HELEN ORFORD.